US009697216B2

(12) United States Patent
Cordella et al.

(10) Patent No.: US 9,697,216 B2
(45) Date of Patent: Jul. 4, 2017

(54) METHOD AND APPARATUS FOR DIFFERENTIATED DATA PLACEMENT

(75) Inventors: David Cordella, Shrewsbury, MA (US); Arthur J. Beaverson, Boxborough, MA (US); Steven Bagby, Lexington, MA (US)

(73) Assignee: SimpliVity Corporation, Westborough, MA (US)

( * ) Notice: Subject to any disclaimer, the term of this patent is extended or adjusted under 35 U.S.C. 154(b) by 0 days.

(21) Appl. No.: 13/186,939

(22) Filed: Jul. 20, 2011

(65) Prior Publication Data

US 2013/0024615 A1 Jan. 24, 2013

(51) Int. Cl.
*G06F 12/08* (2016.01)
*G06F 17/30* (2006.01)
*G06F 3/06* (2006.01)

(52) U.S. Cl.
CPC ........ *G06F 17/30097* (2013.01); *G06F 3/061* (2013.01); *G06F 3/064* (2013.01); *G06F 3/0619* (2013.01); *G06F 3/0643* (2013.01); *G06F 3/0689* (2013.01); *G06F 12/08* (2013.01)

(58) Field of Classification Search
CPC .................................................... G06F 12/08
USPC ........................................................ 711/114
See application file for complete search history.

(56) References Cited

U.S. PATENT DOCUMENTS

| | | | | |
|---|---|---|---|---|
| 2001/0034812 A1* | 10/2001 | Ignatius | ................ | G06F 3/0605 711/112 |
| 2004/0215754 A1* | 10/2004 | Orleth et al. | ................. | 709/223 |
| 2005/0071436 A1 | 3/2005 | Hsu et al. | | |
| 2006/0117323 A1 | 6/2006 | Kendall | | |
| 2006/0161635 A1* | 7/2006 | Lamkin et al. | ............... | 709/217 |
| 2009/0204636 A1 | 8/2009 | Li et al. | | |
| 2009/0228460 A1* | 9/2009 | Martinez et al. | ................. | 707/3 |
| 2009/0292734 A1* | 11/2009 | Miloushev et al. | ........ | 707/104.1 |
| 2010/0037161 A1* | 2/2010 | Stading et al. | ............... | 715/764 |
| 2010/0114848 A1* | 5/2010 | McKelvie et al. | ............ | 707/704 |
| 2010/0250549 A1* | 9/2010 | Muller et al. | ................. | 707/741 |
| 2010/0324999 A1* | 12/2010 | Conway et al. | ........... | 705/14.73 |
| 2011/0022566 A1* | 1/2011 | Beaverson et al. | ........... | 707/639 |
| 2011/0055494 A1 | 3/2011 | Roberts et al. | | |
| 2011/0055621 A1* | 3/2011 | Mandagere et al. | .............. | 714/4 |
| 2011/0196838 A1* | 8/2011 | Zunger et al. | ................ | 707/636 |

FOREIGN PATENT DOCUMENTS

WO        WO03014939          2/2003

OTHER PUBLICATIONS

International Search Report and Written Opinion in corresponding PCT/US2012/046398 mailed May 2, 2013.
Lo S-L: "Ivy: a study on replicating data for performance improvement", HP Labs Technical Report, XX, XX, Dec. 14, 1990 (Dec. 14, 1990), pp. 1-39, XP002265842, the whole document.

* cited by examiner

*Primary Examiner* — Tuan Thai
*Assistant Examiner* — Gautam Sain
(74) *Attorney, Agent, or Firm* — Polsinelli PC

(57) ABSTRACT

Method and apparatus for locating data on disk storage, wherein multiple instances of data can be stored at different locations to satisfy different use requirements such as read access, write access, and data security. The method allows a data storage system, such as a file system, to provide both read optimized and write optimized performance on disk storage of different types (e.g., sizes and speed).

19 Claims, 8 Drawing Sheets

METHOD AND APPARATUS FOR DIFFERENTIATED DATA PLACEMENT

FIELD OF THE INVENTION

The present invention relates to computer storage systems and to methods and apparatus for placement of multiple instances of data on disk storage to simultaneously benefit I/O profiles that are different, such as read and write access.

BACKGROUND

A significant job of a file system is to place data on a storage medium, such as a disk storage device. Where the data is written (placed on the disk), and when and how it is accessed, can have a significant effect on performance. For example, random reads of 4 KB blocks on a disk may result in a bandwidth of 512 KB/sec, whereas reading large 128 KB blocks sequentially can increase the bandwidth to 5 MB/sec, a factor of 10 greater.

This suggests that if one were to optimize for write access, a file system would write all new data in sequential order, treating the disk as a large queue. Subsequent read access, however, might suffer from a large amount of random I/O.

Conversely, a read friendly data placement might place data that is logically adjacent in a file physically adjacent on a disk regardless of the order in which the data is written so that subsequent reads of the data will be sequential; many defragmenters do this, as do file systems. This comes at the expense of write performance, as a write to a file touches other internal file system data structures (such as super blocks, modes, indirection tables), with the result that a read optimized data placement tends to randomize write access.

File systems are most often forced to choose, at design time, the I/O profile of greatest interest, which then determines a fixed data location strategy. Some file systems select for read performance, others for writes, and others still for small file (high density) vs. large file (low density) access.

The allocation constraints of traditional prior art file systems are due in large part to their ability to place only one instance of data on the disk storage. Existing file systems do not have the capability to place and manage multiple copies of data on disks, in different orders, for the benefit of different I/O profiles and use cases.

SUMMARY OF THE INVENTION

Apparatus and methods are provided in accordance with the present invention wherein multiple instances of data can be placed at different locations on disk storage, and in different data orders (sequences), for the benefit of multiple input/output and/or other use profiles, and/or to provide data security. The data placement is performed in conjunction with an index for mapping a unique data identifier to multiple locations, wherein the data identifier does not change based on the locations.

In accordance with one embodiment, a storage system is provided comprising an interface component for locating data for storage on disk storage, wherein the interface component references each data by a globally unique identifier (GUID) and the GUID does not change based on where the data are stored on the disk storage; and a mapping index that allows, for a single GUID, multiple pointers to different locations on the disk storage for multiple instances of data.

In one embodiment, the interface comprises a file-based storage system.

In one embodiment, the interface comprises a block storage manager.

In one embodiment, a location strategizer is provided for determining multiple locations on the disk storage for multiple instances of the data for different purposes.

In one embodiment, the multiple purposes include read optimization and write optimization.

In one embodiment, the multiple purposes include read optimization, write optimization, and data security.

In one embodiment, the location strategizer dynamically determines the multiple locations as the data is referenced by the interface component.

In one embodiment, the mapping index is implemented by programmable logic.

In one embodiment, the mapping index is implemented by executable computer program instructions.

In another embodiment of the invention a storage system is provided comprising programmable logic configured to implement a method of locating data on disk storage, or a computer medium containing executable program instructions for executing the method, wherein the method comprises:

locating data for storage on disk storage including referencing each data by a globally unique identifier (GUID) that does not change based on where instances of the data are stored on the disk storage;

maintaining a mapping index that allows, for a single GUID, multiple pointers to different locations on the disk storage for storing multiple instances of the data.

In one embodiment, the locating step comprises determining the physical locations for storing instances of the data based on one or more of read access, write access, and data security.

In one embodiment, the location step is performed dynamically during storage system activity.

In one embodiment, the method includes locating multiple instances for read optimization and write optimization.

In one embodiment, the method includes locating multiple instances on different disks for read optimization and write optimization.

In one embodiment, the method includes locating multiple instances on different disks for read optimization, write optimization and data security.

In one embodiment, the index includes a data structure for each data containing pointers to physical block addresses where the data instances are stored on the disk storage.

In one embodiment, the GUID comprises a hash of the data content, preferably a cryptographic hash or collision resistant hash of the data content.

In one embodiment, the index maps to physical locations on a plurality of disks.

In one embodiment, the disks are of different sizes and/or access speeds.

In one embodiment, the data comprises data and/or metadata, and collections of data have their own GUID derived from the contents of the collection such that a change to one or more data of the collection changes the collection GUID.

In one embodiment, the disk storage includes multiple disks and the method includes locating multiple instances for read optimization and write optimization on one or more of the disks.

In one embodiment, the disks are of different sizes and/or access speeds.

In another embodiment of the invention, a computing environment is provided for locating data of a storage system to disk storage, a data structure comprising, for each data of the storage system:

a content-derived and globally-unique identifier (GUID), wherein the GUID does not change based on where instances of the data are stored;

a plurality of pointers to physical locations on disk storage where instances of the data are stored.

BRIEF DESCRIPTION OF THE DRAWINGS

The invention will be more fully understood by reference to the following detailed description of various embodiments, along with the following drawings wherein.

DETAILED DESCRIPTION

According to one embodiment of the invention, a data placement method and apparatus are provided for use with a storage system that stores data on disk storage. The storage system may comprise for example a file system, a block storage device, or other storage system for storing data. Data written to such storage systems typically comprises many small (e.g., 4 KB) pieces of data, herein referred to interchangeably as data or data elements, which data may be of the same or variable sizes.

As used herein, data means an opaque collection of data, e.g., any sequence of symbols, (typically denoted "0" and "1") that can be input to a computer, stored and processed there, or transmitted to another computer. As used herein, data includes metadata, a description of other data.

The storage system uses an identifier or name to reference each data element in storage. The name is a GUID (globally unique ID), such as a hash of the data content, preferably a cryptographic hash or collision resistant hash of the data content; other naming conventions are possible, as long as each data element has a unique name within the system. In an alternative embodiment, a central GUID server generates the names from some distinguishing aspect of the data. Data names are usually fixed length binary strings intended for use by programs, as opposed to humans. In the present example, the data name is a content-derived (derived from the data content) and globally-unique identifier referred to as a GUID.

An index (sometimes referred to as a dictionary or catalog) of all the data is needed by the file system in order to access (locate) each data element. Each record in the index may contain the data name, location and other information. According to the present invention, an index entry for a given GUID can map a single GUID to a plurality of physical locations on disk for storing multiple instances of the one data element. However, as described further below, the GUID does not change based on the locations where the data instances are stored.

After a discussion of the problems inherent in prior art systems, a detailed description of various embodiments of the invention are set forth in conjunction with FIGS. 4-9.

Figure 1:
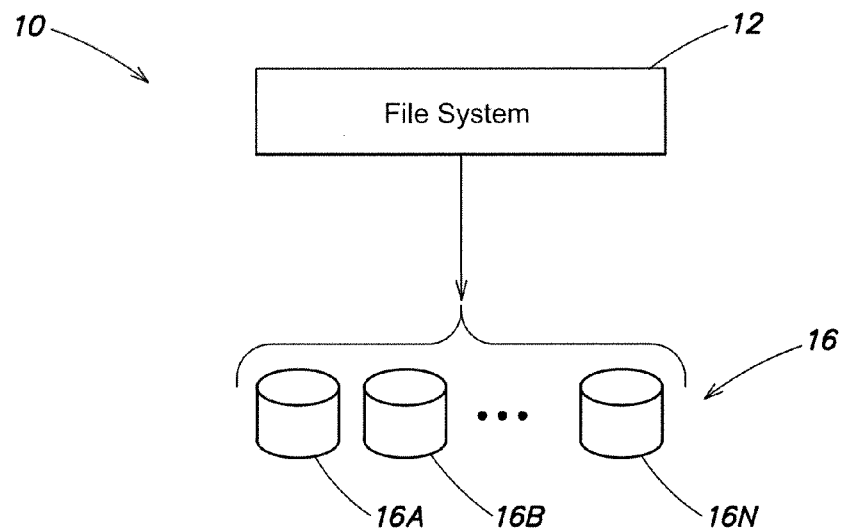
FIG. 1 is a schematic block diagram of a file-based prior art storage system utilizing disk storage.

FIG. 1 is a schematic diagram of a prior art file-based data storage system 10. At the top of the system, a file system 12 manages all file system data stored on back end storage 16, here a plurality of physical disks 16A, 16B . . . 16N. The file system tracks locations of data on the disks.

Figure 2:
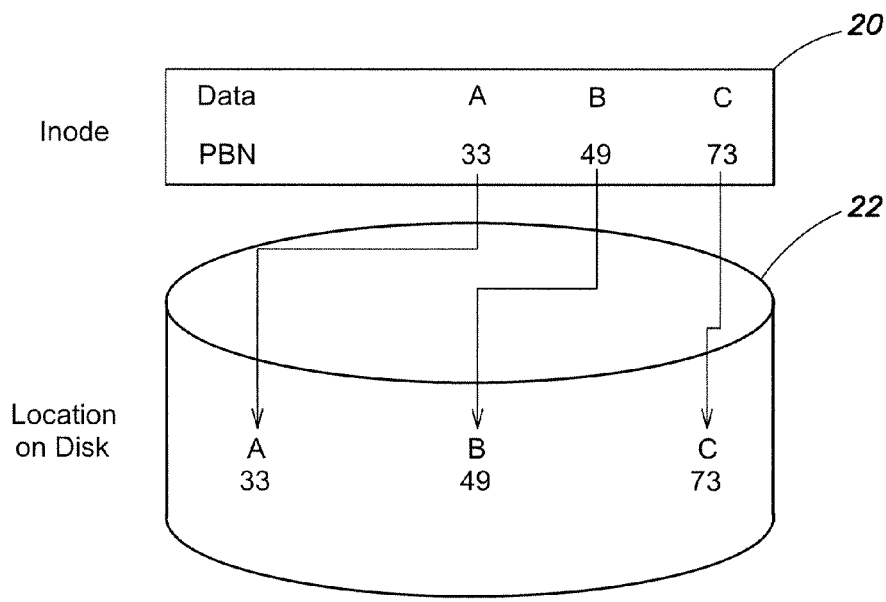
FIG. 2 is a schematic diagram of a prior art file system data structure showing the the location of data on disk storage.

FIG. 2 illustrates one example of a prior art file system for locating data of a file Foo, containing data elements A, B, and C, to physical locations on a disk. In the file system inode data structure 20, each data element has a corresponding physical block number (PBN) which is a pointer to a location on disk 22 where the data A, B and C is stored. Here, one instance of each data element is stored at the respective locations 33, 49 and 73.

Figure 3A:
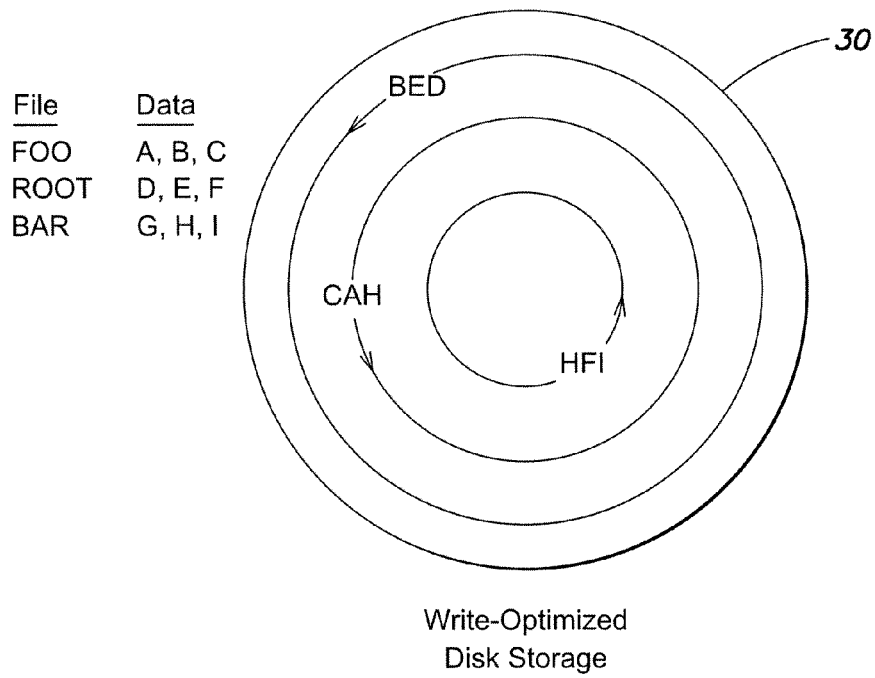
FIGS. 3A and 3B are schematic diagrams illustrating one example of write-optimized (FIG. 3A) or read-optimized (FIG. 3B) storage of file data on disk storage according to the prior art.
Figure 3B:
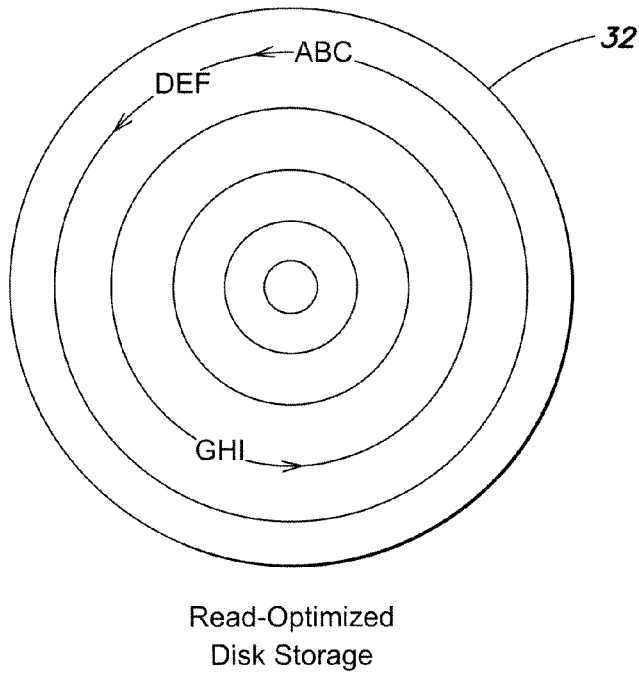

The practical effect of a file system designed to store one instance of data is illustrated in FIGS. 3A and 3B. FIG. 3A shows a write-optimized disk storage in which the data elements of three files, named: Foo, Root and Bar, are stored on one disk 30. As an application may write the elements of different files in any order based on use, the elements of the different files appear to be randomly (not logically) arranged on the disk. Here elements B, E, and D are stored on an outer track of the disk, elements C, A, and H on an intermediate track, and elements H, F, and I on an inner track. To read all elements of single file, e.g., Foo, which consists of elements A, B, and C, would require movement of the disk head between the three locations; this movement of the disk head is time consuming and degrades the read performance.

In contrast, in a read-optimized disk storage system (FIG. 3B), the file system can read in sequence all elements of a file from one sequential track location of disk 32. In this example, the file system may also locate Foo and Bar adjacent to one another on the disk to avoid movement of the disk head between sequential reads of these two files. However, the initial writing of files Foo, Bar and Root onto the disk will likely require movement of the disk head to optimize for subsequent reads.

Thus, the prior art file system optimizes for either writes or reads, resulting in different placement of the data on the disk. When optimized to write, a read will likely require movement of the disk head. Similarly, in a system optimized to read, a write will likely require movement of the disk head.

Figure 4:
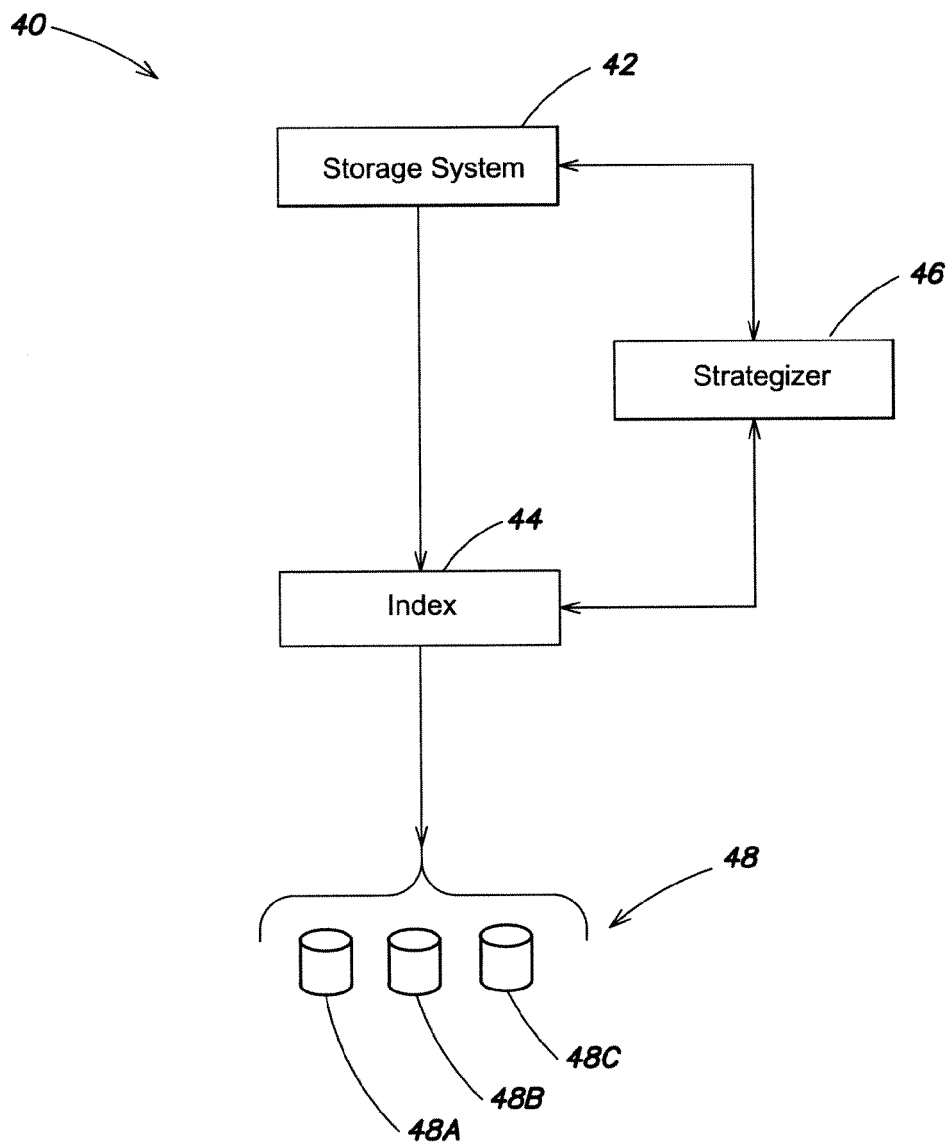
FIG. 4 is a schematic block diagram of one embodiment of the present invention, in which an index and strategizer are provided for determining the placement (location) of data on disk storage.
Figure 5:
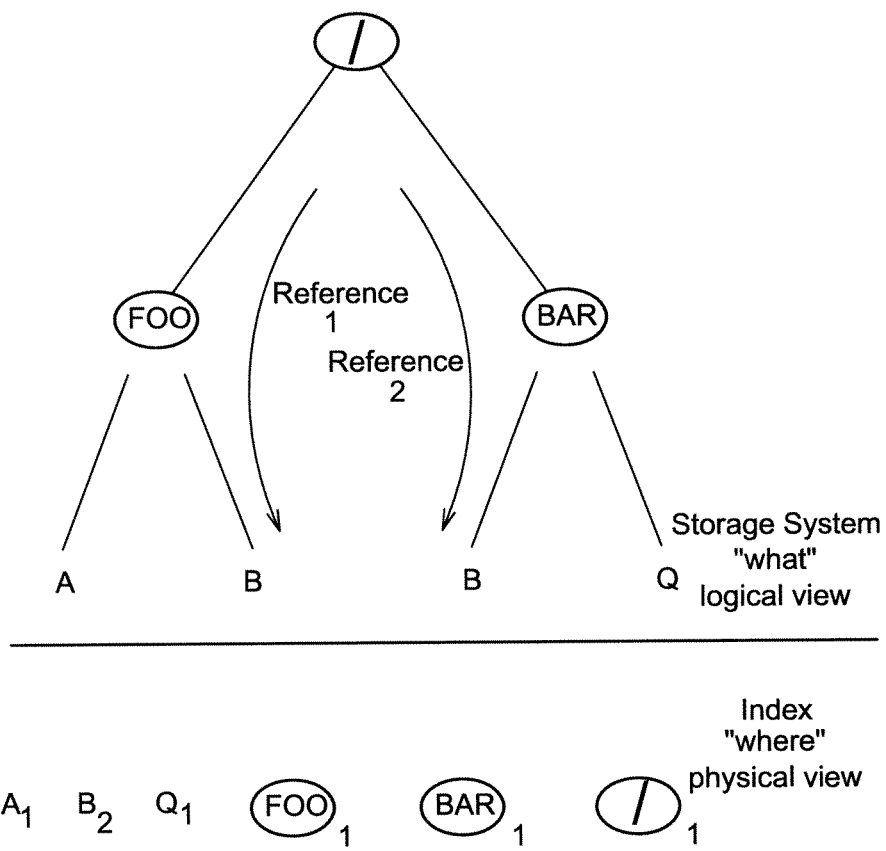
FIG. 5 is a schematic diagram illustrating the storage system view versus the index view according to one embodiment of the invention.

FIG. 4 is a schematic block diagram of one embodiment of the invention. In this embodiment, the storage system 40 includes an index 44 and strategizer 46 for use with a file system interface 42 and disk storage 48. The storage system utilizes the index for storing data in a manner that eliminates the requirement for the storage system to keep track of where data is stored on the back end disk storage 48. The index 44 maps each data GUID to one or more physical locations where instance(s) of the data are stored on disk storage 48. In contrast with prior art systems that track data directly by physical location of the data for purposes of read and write access, here, the index allows the storage system to refer to data using the GUID as a logical abstraction and utilizes an index data structure that allows multiple physical locations for multiple instances of a single data element. From the logical perspective of the storage system (see FIG. 5) there is only one instance of the data; this means the storage system references the data name (GUID) and the name does not change based on where the multiple instances of the data are stored. In contrast, the index maintains a physical view of "where" (the physical locations on disk) the multiple instances of the data are stored (see FIG. 5).

The mapping index 44 allows, for a single data name (GUID), multiple pointers to multiple instances of the data on the disk storage. A location strategizer 46 determines these multiple locations for different purposes and the physical locations can be dynamically changed over time for different purposes. Because the storage system knows the logical relationships (the "what") of the objects, the storage system can suggest desired location strategies to the strategizer for determining these multiple locations. Still further, this strategy can be determined dynamically during storage system activity to change the strategy as the anticipated use of the data, condition of the disks, or other system parameters change over time. Thus, location is no longer fixed or limited in time as in the prior art methods of allocation.

Figure 6A:
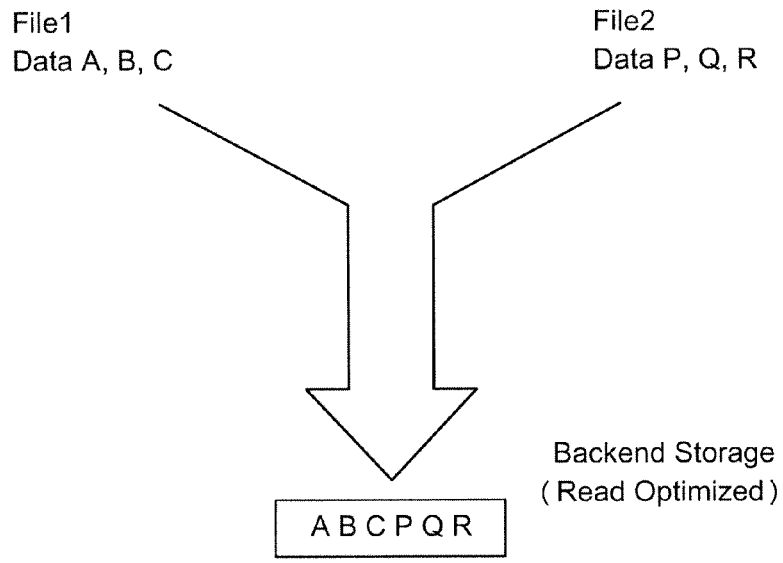
FIG. 6A is a schematic diagram of a read-optimized placement of data on disk storage according to one embodiment of the invention.
Figure 6B:
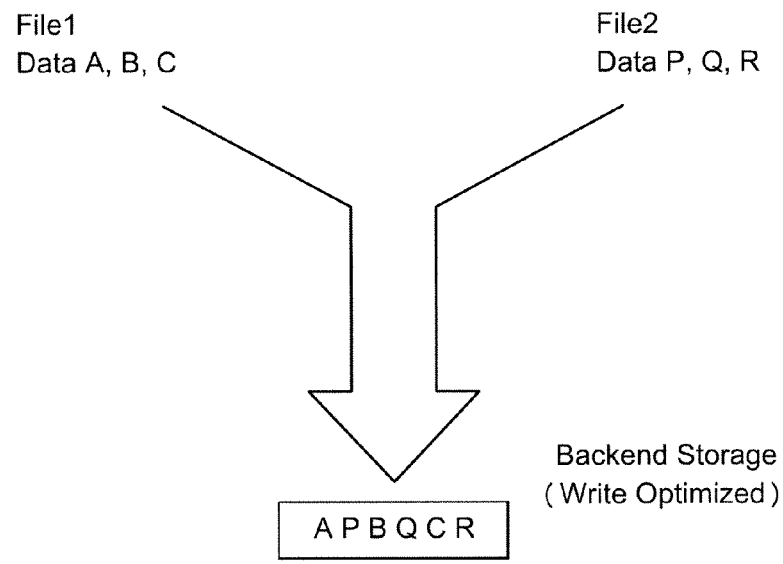
FIG. 6B is a schematic illustration of a write-optimized placement of data on disk storage according to one embodiment of the invention.

FIGS. 6A-6B illustrate two strategies for data location for different purposes according to one embodiment. In FIG. 6A, File 1 contains data elements A, B and C, and File 2 contains data elements P, Q and R. The strategizer 46 decides to locate one instance of each data element for read optimization on the back end storage. As shown in FIG. 6A, the data elements A, B and C of File 1 are located physically adjacent to one another, while the data elements P, Q and R of File 2 are located physically adjacent one another. Thus, when the file system wants to read either file, all data in the file are proximately located.

In FIG. 6B, the strategizer locates a second instance of the data of Files 1 and 2 for write optimization on the back end storage. Here, the data of Files 1 and 2 are simply written in the order in which the file system writes the data. This avoids head movement during the write process. However, for purposes of reading the data of one file, the file system would utilize the data instances at the location shown in FIG. 6A for optimizing read time.

Figure 7:
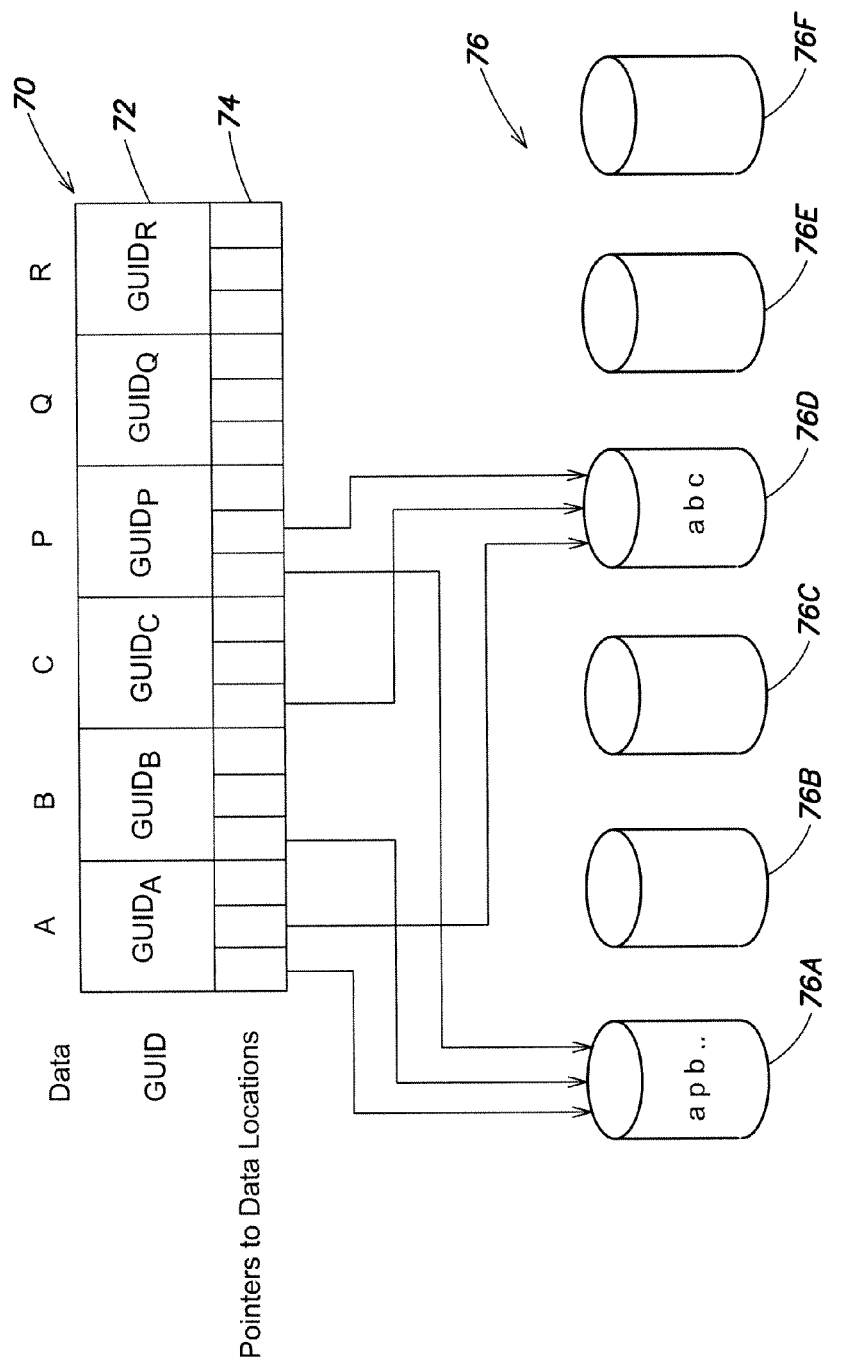
FIG. 7 is a schematic illustration of an index data structure for mapping multiple instances of data to multiple physical locations on disk storage according to one embodiment of the invention.

FIG. 7 is a schematic diagram illustrating a data structure 70 according to one embodiment of the invention. Each of the previously mentioned storage system data elements A, B, C, P, Q and R have an associated data GUID, here generated by applying a hash algorithm to the data's content. The index data structure 70 includes the GUID 72 and one or more pointers 74 to physical locations on the disk storage 76 where the one or more instances of the data are stored. Here, two instances of data A are stored on two different disks, disks 76A and 76D. Likewise, one instance of B is stored on disk 76A. One instance of C is stored on disk 76D and two instances of P are stored on the disks 76A and 76D. The storage of data A, B and C on disk 76D would provide read-optimization for the File 1 (as illustrated in FIG. 6A). The data stored on disk 76A would provide write-optimization as illustrated in FIG. 6B.

The prior illustration is just one example of the invention for simultaneously optimizing both read and write access by locating multiple instances of data in different orders at multiple physical locations on the disk storage. These and other examples of a location strategy for disk storage will be apparent to those of ordinary skill in the art.

Figure 8A:
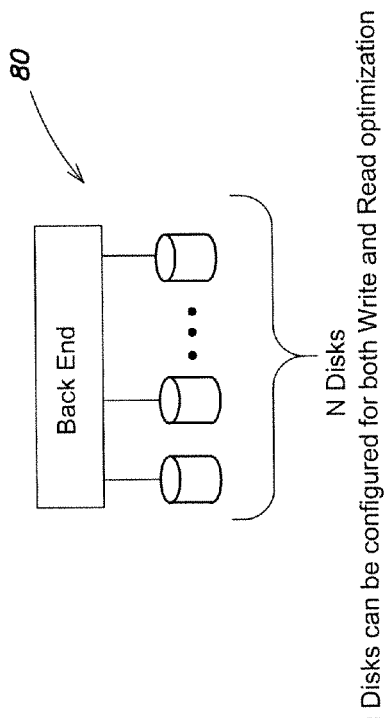
FIGS. 8A and 8B illustrate two methods of write and read optimization according to various embodiments of the invention.
Figure 8B:
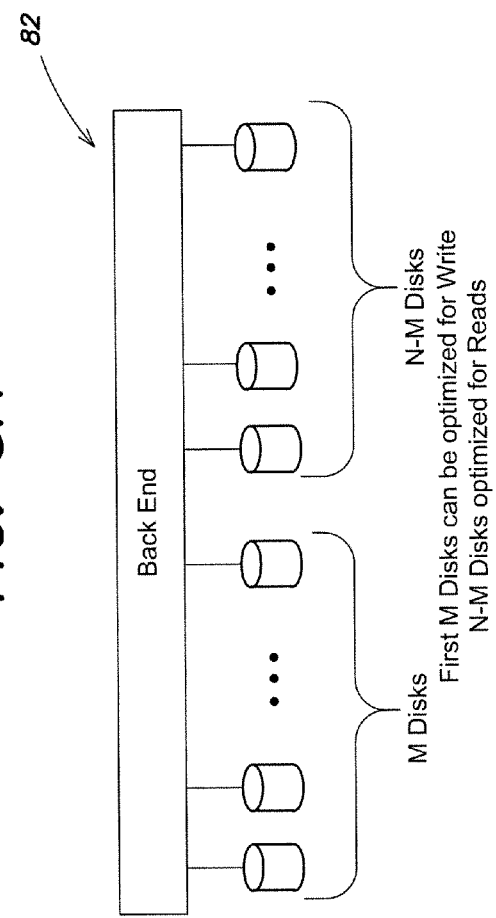

FIG. 8A is a schematic illustration of a back end disk storage 80 including a multiple number of disks. These N disks can be configured for both write and read optimization. Alternatively, FIG. 8B shows a backend disk storage 82 in which the first N disks have been optimized for write, and the remaining N-M disks have been optimized for read.

Various embodiments of the present invention can provide one or more benefits over the prior art methods such as optimizing both read and write performance. For example, in the prior art, disk defragmentation may be utilized for read or write optimization. However, the defragmentation is an expensive process time-wise, and one needs to know beforehand how the data will be used (e.g., read). In contrast, the present invention allows for a dynamic determination of location which permits storing multiple instances of data at different disk locations and within different data sequences at each location.

Furthermore, most prior art storage systems do not allow for the maintenance of two instances of the content of a given file. The reason is this would complicate the storage system data structures and require excessive (costly) storage capacity. In contrast, the present invention provides a simplified method allowing multiple instances of data to be stored without affecting the storage system data structure.

The prior art RAID systems operate by striping data across multiple disks so that if one disk crashes, another instance of the data will survive. Data locations in a RAID system are based on a fixed algorithm rather than the dynamically variable location made possible by pointers (as in the present invention). As a result, RAID requires all of the multiple disks to be of the same type, e.g., size and speed. This would be an undesirable limitation on a user who needs/wants to utilize or has pre-existing disk storage of different types.

The subject matter of the present invention may be implemented as computer executable instructions (software). It may also be implemented in hardware as a series of logic blocks.

Figure 9:
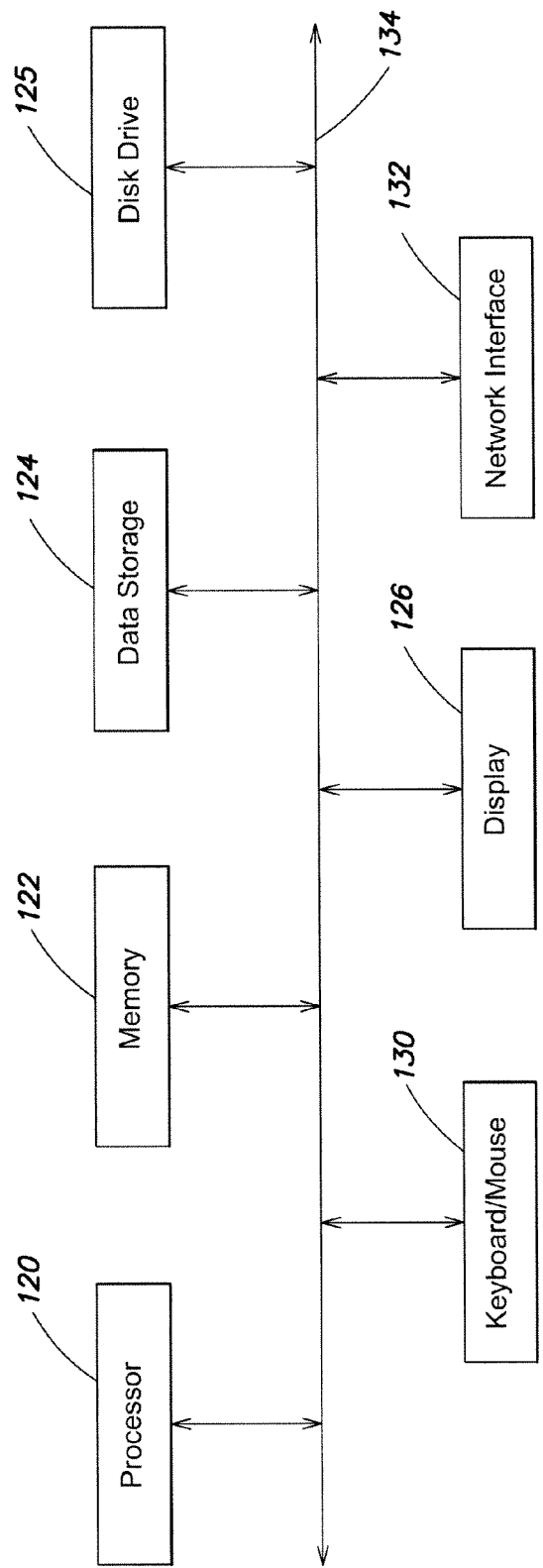
FIG. 9 is a schematic illustration of one embodiment of a computing apparatus.

One or more components of the present invention may be implemented by a computing apparatus such as that illustrated in FIG. 9. The apparatus may include one or more of a processor 120, memory 122, data storage 124, disk drive 125, keyboard/mouse 130, display 126, and network interface 132. The components maybe coupled together and communicate via a system bus 134. The software product(s) of the present invention may be loaded into data storage 124 and during operation transferred into (e.g., RAM) memory 122 and executed by processor 120.

The flowchart and block diagrams contained herein illustrate various examples of an architecture, functionality, and operation of possible implementations of systems, methods and computer program products according to various embodiments of the invention. In this regard, each block in a flowchart or block diagram may represent a module, segment, or portion of code, which comprises one or more executable instructions for implementing the specified logical function(s). In alternative implementations, the functions noted in the block may occur out of the order noted in the figures. For example, two blocks shown in succession may, in fact, be executed substantially concurrently, or the blocks may be executed in the reverse order, depending upon the functionality involved. Each block of the block diagrams and/or flow chart illustration, and combinations of blocks in the block diagrams and/or flowchart illustration, can be implemented by a general computer or by special purpose hardware-based systems that perform the specified functions or acts, or by combinations of special purpose hardware and computer instructions.

As used herein, computer-readable media can be any media that can be accessed by a computer and includes both volatile and non-volatile media, removable and non-removable media.

As used herein, disk storage can be used for the storage of information such as computer-readable instructions, data structures, program modules, or other data. Disk storage includes any magnetic, solid state or optical disk storage which can be used to store the desired information and which can be accessed by a computer.

As used herein, the term "includes" and its variants are to be read as open-ended terms that mean "includes, but is not limited to." The term "or" is to be read as "and/or" unless the context clearly dictates otherwise.

It is to be understood that the foregoing description is intended to illustrate and not limit the scope of the invention.

The invention claimed is:

1. A storage system comprising:
    an interface component of a file-based storage system or a block storage manager for placing, by one or more processors, data for storage at physical locations on disk storage, wherein the interface component references each data element in the data by a globally unique identifier (GUID) derived from the content of the data element such that the GUID must change when content of the data element changes, and wherein the GUID does not change based on where multiple instances of the data element are stored at different physical locations on the disk storage;
    a mapping index, accessible by the one or more processors, that stores, for a single GUID, multiple pointers to different physical locations on the disk storage for multiple instances of the data element; and
    a location strategizer for dynamically determining, by the one or more processors, the different physical locations on the disk storage for storing the multiple instances of the data element as the data element is referenced by the interface component during storage system activity, and wherein the location strategizer stores the multiple instances of the data element within different data sequences at the different locations on the disk storage for read optimization and write optimization, the different data sequences having different orders of the stored data elements.

2. The storage system of claim 1, wherein the interface component comprises a file-based storage system.

3. The storage system of claim 1, wherein the interface component comprises a block storage manager.

4. The storage system of claim 1, wherein the location strategizer places multilple instances for data security.

5. The storage system of claim 1, wherein the location strategizer dynamically determines the different locations as the data is referenced by the interface component based on anticipated use of the data, condition of disks, or as other system parameters change over time.

6. The storage system of claim 1, wherein the mapping index is implemented by programmable logic.

7. The storage system of claim 1, wherein the mapping index is implemented by executable computer program instructions.

8. A non-transitory computer medium containing executable program instructions for executing a method comprising:
    referencing each data element by a globally unique identifier (GUID) derived from the content of the data element such that the GUID must change when content of the data element changes, and wherein the GUID does not change based on where multiple instances of the data element are stored at different physical locations on a disk storage;
    maintaining a mapping index that stores, for a single GUID, multiple pointers to different physical locations on the disk storage for storing multiple instances of the data element;
    dynamically determining, as the data element is referenced during storage system activity, the physical locations for storing the multiple instances of the data element at the different locations on the disk storage to benefit I/O profiles for both read access and write access; and
    storing the multiple instances of the data element at the determined different locations within different data sequences at the different locations on the disk storage for read optimization and write optimization, the different data sequences having different orders of the stored data elements.

9. The non-transitory computer medium of claim 8, wherein the method includes placing multiple instances of data elements, in the different data sequences, for data security.

10. The non-transitory computer medium of claim 8, wherein the method includes placing multiple instances on different disks for read optimization and write optimization.

11. The non-transitory computer medium of claim 8, wherein the method includes placing multiple instances on different disks for read optimization, write optimization and data security.

12. The non-transitory computer medium of claim 8, wherein the index includes a data structure for each data element containing pointers to physical block addresses where the multiple instances of the data element are stored on the disk storage.

13. The non-transitory computer medium of claim 8, wherein the GUID comprises a hash of the content of the data element.

14. The non-transitory computer medium of claim 8, wherein the GUID comprises a cryptographic hash or collision resistant hash of the content of the data element.

15. The non-transitory computer medium of claim 8, wherein the index maps to physical locations on a plurality of disks.

16. The non-transitory computer medium of claim 15, wherein the disks are of different sizes and/or access speeds.

17. The non-transitory computer medium of claim 8, wherein:
    the data elements comprises data and/or metadata, and collections of data elements have their own GUID derived from the contents of the collection such that a change to one or more data elements of the collection changes the collection GUID.

18. The non-transitory computer medium of claim 8, wherein the disk storage includes multiple disks and the method includes placing multiple instances of the data element for read optimization and write optimization on the multiple disks.

19. The non-transitory computer medium of claim 18, wherein the disks are of different sizes and/or access speeds.

* * * * *